A. E. IRELAN.
CORNER FASTENER FOR BEDSTEADS.
APPLICATION FILED FEB. 26, 1908.
902,085.
Patented Oct. 27, 1908.
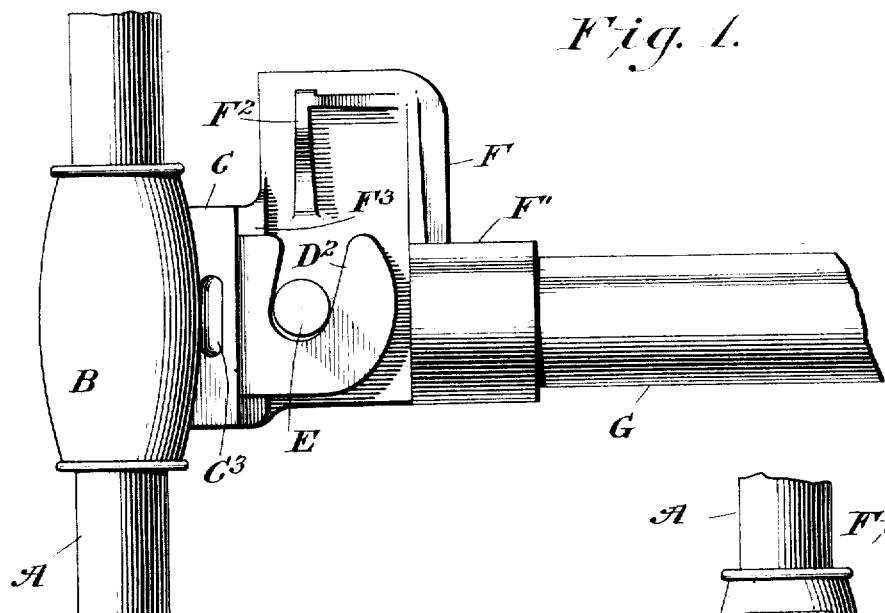
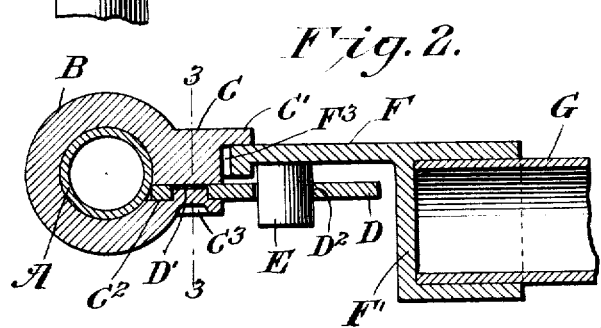
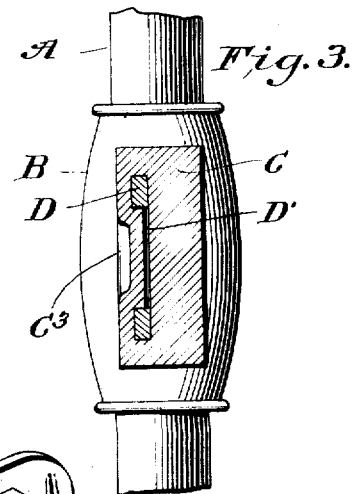
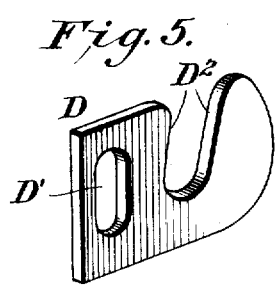
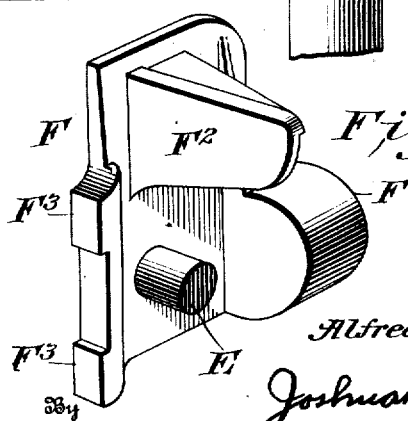
Inventor
Alfred E. Irelan

UNITED STATES PATENT OFFICE.

ALFRED E. IRELAN, OF PHILADELPHIA, PENNSYLVANIA, ASSIGNOR TO PHILADELPHIA METALIC BED COMPANY, OF PHILADELPHIA, PENNSYLVANIA.

CORNER-FASTENER FOR BEDSTEADS.

No. 902,085.　　　Specification of Letters Patent.　　　Patented Oct. 27, 1908.

Application filed February 26, 1908. Serial No. 417,815.

*To all whom it may concern:*

Be it known that I, ALFRED E. IRELAN, a citizen of the United States, residing at Philadelphia, in the county of Philadelphia and State of Pennsylvania, have invented certain new and useful Improvements in Corner - Fasteners for Bedsteads, of which the following is a specification.

This invention relates to corner fasteners for bedsteads, the object being to provide a fastener which is exceedingly simple and cheap in construction, and one which is very neat in appearance.

Another object of my invention is to enable the side and end rails to be readily attached to or detached from the corner post, in such a way that they will be held very rigidly.

Another object of my invention is to provide novel means for securing the supporting hook to the sleeve carried by the corner post, whereby it will be held in a rigid position.

These objects are obtained by the novel arrangement and construction of parts hereinafter fully described and shown in the accompanying drawings, in which:

Figure 1, is a side elevation of a portion of a bedstead showing the application of my improved fastener. Fig. 2, is a horizontal section through my improved fastener. Fig. 3, is a vertical section taken on line 3—3 of Fig. 2. Fig. 4, is a perspective view of the fastening member carried by the side rail, and, Fig. 5, is a perspective view of the supporting hook detached.

In the drawings A indicates a corner post of a bedstead provided with a vertical rib or projection C made integral with the sleeve. This rib is longitudinally recessed on its outer edge as at C², and at one side of the recess and parallel with it is a longitudinal flange C', which projects outward from the edge of the rib C.

The recess C², is for the purpose of receiving and securely holding the hook D. This is formed of a plate of metal having a slot at its rear. The hook is intended to be inserted into the recess C² after which the material of the rib C is forced from one side into the slot C³, so as to securely lock the hook rigidly in place in the recess and hold it to the sleeve B as if it was made a part thereof. The sleeve is preferably made of malleable iron and is thus more readily adapted to be forced in the opening of the hook. This construction while very simple and relatively cheap is very strong and there is no chance of the hooks becoming detached from the sleeve.

By reference to Fig. 2, it will be seen that between the shoulder C' and the hook D, there is left a space. This space is adapted to receive the projecting vertical web of the horizontal member of the bed.

The walls of the slot D², are inclined as shown and adapted to receive a stud pin E, carried by a terminal member F, having a socket F'', in which the tubular side rail G, of the bed is adapted to be secured. The member F, is provided with a bracket F², over which the end of the angle end rail is adapted to fit (not shown).

The member F is provided with the vertical projecting web whose edge is adapted to fit between the flange C' and the hook D, and to be forced up against the end of the rib C by the inclined walls of the hook when pressure is downwardly applied on the side bars.

I have shown the web F as made with two enlarged shoulders along its edge, these shoulders contacting with the rear end of the recess formed between the hook D and the flange C'. The heads being laterally enlarged fit very closely into this space or recess and give a more rigid bearing.

A shoulder C⁴ is formed on the interior of the recess or space which engages with the portion of the web which is cut away between the two projecting shoulders F³. It will be readily seen that the stud pin E, engaging the inclined walls of the hook D, will force the portions F³, tightly against the shoulder, so as to form a very rigid joint, and it will be seen that when it is desired to remove the post, it is only necessary to give the member F, a slight tap which will knock the pin up out of the hook. It will be seen that by securing the hook in the shoulder in this manner, the use of pins or bolts is dispensed with, and a much tighter means for fastening the hook member is provided, as the portion punched into the opening of the hook will fit it snugly, so that it will be impossible for the same to move in any direction.

Having thus described my invention what I claim as new and desire to secure by Letters Patent is:—

In a bedstead, a vertical post having thereon a sleeve provided with an outwardly projecting rib, said rib being recessed longitudinally along its outer edge, a hook-plate fitting in said recess, said plate being slotted and having the wall of said recess forced into said slot, the rib being also provided with a projecting flange parallel to the hook-plate but spaced therefrom, and with an outwardly projecting shoulder located between said flange and the hook-plate; in combination with a horizontal rib having at its end a terminal cap, an outwardly projecting web having laterally enlarged projecting shoulders adapted to fit between the hook-plate and the adjacent flange and over said intermediate shoulder, and a laterally projecting pin on the web engaging with the hook-plate.

In testimony whereof I have signed my name to this specification in the presence of two subscribing witnesses.

ALFRED E. IRELAN.

Witnesses:
R. H. KRENKEL,
CHAS. E. POTTS.